Aug. 28, 1934.　　　　D. C. SCOTT　　　　1,971,796

SEWAGE TREATMENT APPARATUS

Filed Oct. 28, 1931　　　2 Sheets-Sheet 1

INVENTOR
Donald C. Scott

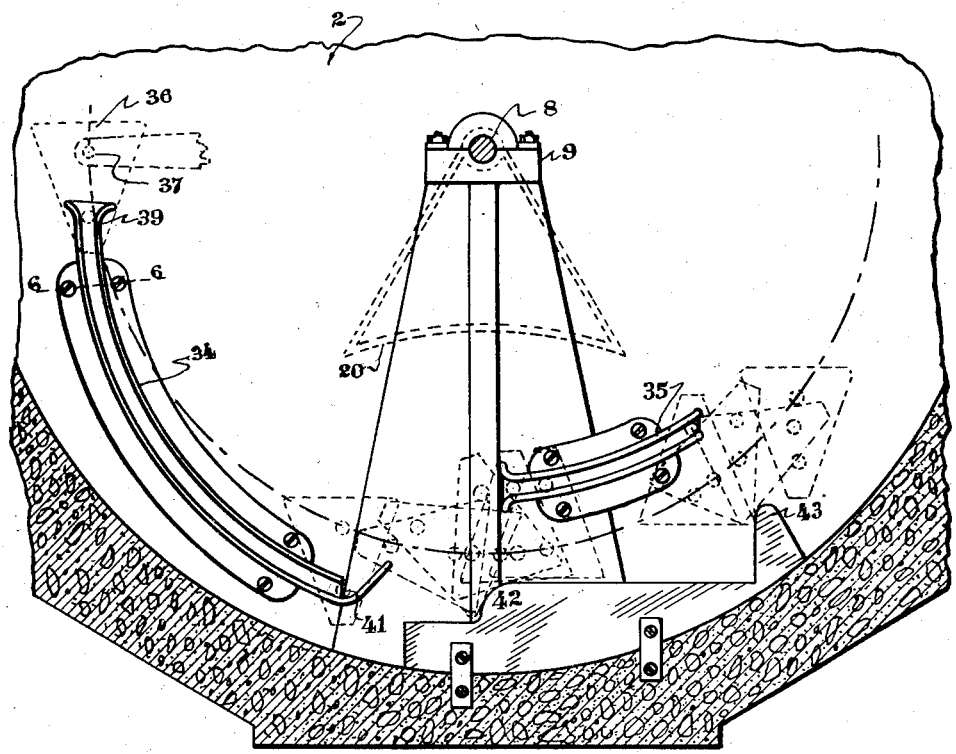
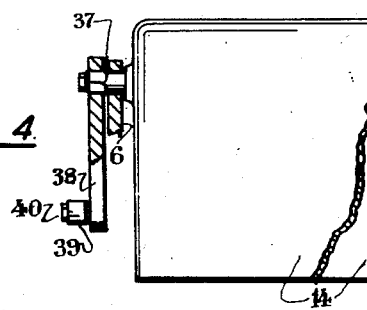
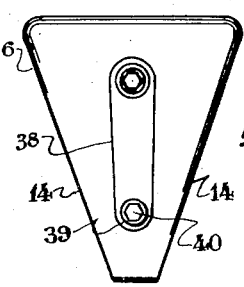
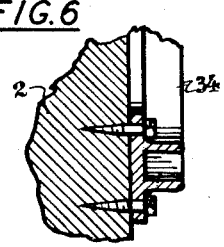
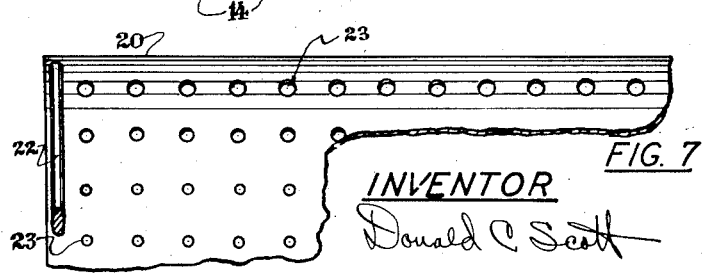

Patented Aug. 28, 1934

1,971,796

UNITED STATES PATENT OFFICE 1,971,796

SEWAGE TREATMENT APPARATUS

Donald C. Scott, Phoenix, Ariz.

Application October 28, 1931, Serial No. 571,660

6 Claims. (Cl. 210—8)

In the treatment of sewage it has been found that after the removal of large materials and substances by screening and gravitational settling, there still remains in suspension in the resultant liquor, which is termed "raw sewage", a large amount of finely divided particles and flocculent suspended matter. These substances consist largely of organic matter the tissues of which have been broken down by mechanical disintegration, putrefaction, etc., and will not settle out from the liquor upon standing. If, however, oxygen or air is bubbled through this sewage, a chemical or biochemical action takes place, which causes these substances to unite or cohere, one with another, thus tending to form coarse particles which will readily settle out when the liquor is allowed to stand. Raw sewage thus treated is known to the art as "activated sludge", and the process of subjecting raw sewage to aeration and agitation to produce this effect may be termed "activation."

If previously activated sludge is mixed with raw sewage and activation continued, the small particles unite more readily with the larger particles in the treated sludge than with each other and the process of obtaining particles large enough to quickly settle is greatly expedited. In order to effectively operate this process, however, it is necessary to continuously stir or agitate the liquor in order to keep it thoroughly mixed, to bring all parts in contact with the air bubbles, and to prevent settling out of the larger particles until the sludge is removed from the activator tanks to the settling tanks.

Heretofore, it has been the practice to depend on the action of compressed air introduced near the bottom of the activator tanks to produce the necessary agitation. This has proved ineffective and inefficient especially with heavy sludge and the heavy aggregate mixtures, although it is known that greater efficiency in the building up process can be produced by returning large percentages of activated heavy sludge to the incoming raw sewage.

In consideration of the above, I have devised the following described apparatus, adapted to the process hereinafter set forth for efficiently activating sewage and such industrial wastes as may be adapted to similar processes.

The objects of my invention are, first, to provide a means for contemporaneously agitating and aerating the sewage to be treated; second, to provide a continuously operative unit mechanism which is adapted to agitate the fluid and at the same time release predetermined quantities of compressed air near the bottom of the tank, in such a manner that it will bubble upwardly throughout a large area of the sewage; third, to provide a structure whereby a plurality of operative units may be easily coupled to operate together; fourth, to provide units of a structure whereby in multiple operation the effect is cumulative.

I attain these objects by the mechanism and structures illustrated in the accompanying drawings, in which:—

Figure 3 is a view of a portion of one of the end faces of a tank showing a means for positive alignment and positioning of the compression chamber agitators while immersing and tripping;

Figure 4 is an enlarged side view of one end of a compression chamber agitator;

Figure 5 is an end view thereof;

Figure 6 is an enlarged fragment of the guide channel taken substantially on line 6—6, Figure 3; and, Figure 7 is a plan view of a fragment of the baffle plate.

Similar numerals refer to similar parts throughout the several views.

The tanks 1 in which the activation process is carried on are composed of end walls 2 and side walls 3 converging in rounded semi-cylindrical bottoms constructed in the preferred form of concrete.

It is to be understood that a series or battery of these tanks may be constructed, with raised baffle separators 4 between them so that sewage may flow from one section to another and will be subjected to the continuous successive activation.

Figure 1:
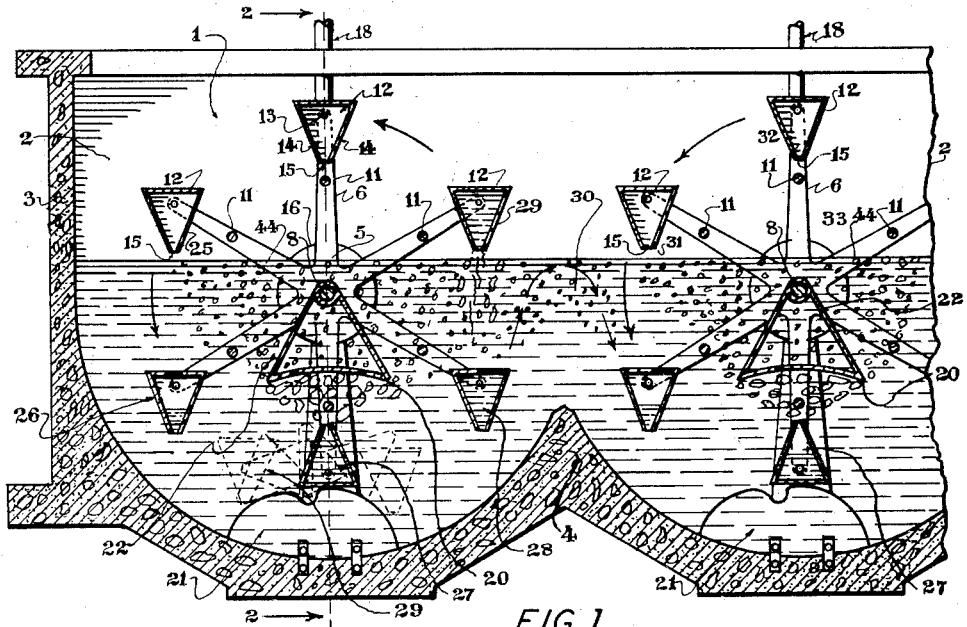
Figure 1 is a vertical section of one end of an agitation tank and a partial section of an adjoining tank taken substantially on line 1—1, Figure 2.
Figure 2:
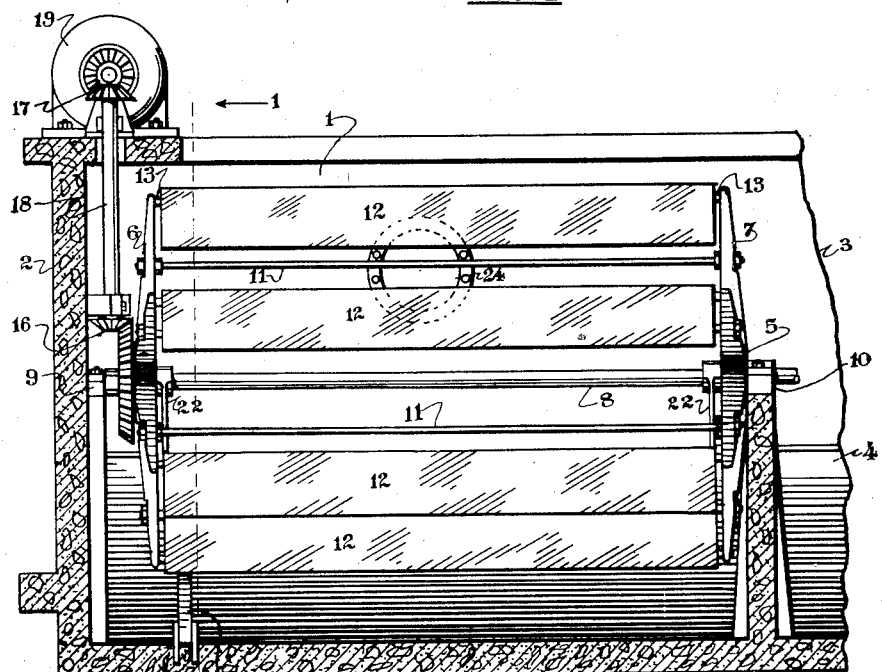
Figure 2 is a vertical section of the end tank taken substantially on line 2—2, Figure 1.

The activators 5 present somewhat of a squirrel cage appearance and consist of two spiders 6 and 7 supported on shaft 8 which turns in bearings 9 and 10. These spiders are held in alignment and relatively fixed position by the tie rods 11. Compression chamber agitators 12 are supported between these spiders by shafts 13 protruding from the ends of the chambers turning in journals near the ends of the spider arms. These compression chambers have rectangular shaped sides and delta shaped ends and sections. The shafts 13 are placed above the axial center of gravity so that during rotation the chambers take the inverted position as shown in Figures 1 and 2, except at the bottom of the cycle where they are tripped. The side walls 14 of these compression chambers converge, but are not joined at the apex. An open slot 15 is thus provided which is proportioned to suit operating conditions. Rotative motion is communicated to the activators through gearing 16 and 17 and shaft 18 driven by motor 19.

It should be noted that the activators are supported within the tanks so that they may turn freely through the semi-cylindrical lower portion.

The baffle plate 20 is suspended by hangars 22 which turn freely on shaft 3 within the cage-like portion of the activators. This baffle plate is curved laterally to present a concave face along the lower portion of the tank above the tripping area and may be pierced with a suitable number of ventholes 23, which are larger and closer together toward the edges so as to release and distribute the air bubbles uniformly.

In the device shown in Figure 3, I have provided arcuate guide channels 34 and 35 attached to the end wall 2 of the tank compartment. The end bearing 37 of compression chamber 36, indicated in dotted outline in this figure, and detailed in Figure 4, is lengthened, squared, and carries the bell crank 38 to which the antifriction thimble 39 is attached by means of bolt 40. The guide channel 34 is so positioned and curved that, as the compression chamber enters the fluid, the thimble 39 enters the guide. As rotation continues the compression chamber is held in a vertical position until well under the baffle 20 (indicated in dotted outline). The lower side of guide 34 turns sharply upward at its lower end 41 and starts the tripping operation which is carried through by cam 42, operative on the chamber case. As the tripping cycle progresses and the compression chamber has been turned over the thimble 39 is caught in guide channel 35 and the chamber thus held in the inverted position until all the entrapped air has escaped. It is then tripped to its original position by cam 43. The successive positions of chamber 36 are indicated in dotted outline.

By this arrangement of parts it is possible to create greater compression in large tanks and to release the air through a smaller opening in the compression chambers more uniformly and slowly. In this way more aeration with less agitation may be effected, which is advantageous with certain types of sludge containing high percentages of industrial waste.

In operation sewage is introduced into the first compartment or tank through supply pipe 24 to the fluid level indicated in Figure 1. The activators are rotated as indicated by the arrows, in a counter clockwise direction. Compression chamber agitators 12 enter the fluid, as at 21, with the opening downward. The air entrapped in the upper part of the chamber 26 is compressed when the chamber, continuing the revolution, descends into the liquid, until the lower lip strikes the tripping cam 21. This causes the compression chamber to tilt as indicated by the dotted outline. Contact with the second hump of the cam causes it to trip, assuming a position with the opening upward, as at 27. The entrapped air rushes to the top of the chamber in this new position, and by reason of its buoyancy holds it in this position until it has bubbled out through the opening. The space occupied by the air is then displaced by the fluid, and when the cam position has been passed, the compression chamber returns to its normal position 28. This tripping motion is indicated by the dotted outlines 29. As the compression chambers leave the fluid the liquid contents spill out and air rushes in to displace the liquid. These operations are continuous and automatic so long as the agitators are rotated.

Air arising from chamber 26 strikes the curved baffle 20, where it is spread out and diffused through the liquid as small bubbles 44. These rise through holes 23 in the baffle plate and around its edges, and continue upward through the liquid.

Air is also drawn into the liquid by the release of the liquid from the chamber at position 29, which carries surface air down as bubbles. These are carried into the liquid in the next compartment as illustrated at 30 by the compression chambers 31, 32, etc. The action of activator 33 in chamber 30 is similar to that of activator 5, and it is to be understood that any desired number of activators may be thus associated in order to effect the desired amount of activation and secure adequate sedimentation. Shaft 8 may also be extended to the right of the break line in Figure 2 and carry a plurality of activators similar to 5 along its length, all cooperative in an extension of tank 1.

By the operation of the structures and devices, above described, it will be seen that I have provided a means for bringing large quantities of air in contact with the liquid sewage mixtures to be treated without the use of independent air supply means. The air bubbles rising through the liquids make possible the chemical or biochemical reactions necessary to cause coherence of the small particles in suspension, and the solidification and coagulation of the flocculent suspended matter. The rotation of the activators carrying the compression chambers provides the necessary amount of agitation to prevent too rapid settling out of the particles and brings all parts of the liquid in contact with the active aeration area.

The process may then be summarized, as follows: Activated sludge and raw sewage are mixed and introduced into the first of a series of tanks separated under the fluid surface by streamlined curved baffles, agitation and aeration are then applied to this mixed liquor as it flows from one tank to the next, by rotating compression chambers whereby it is agitated and coincidentally aerated.

Having now described my invention, and its use, I wish to be limited only to the following claims.

I claim—

1. A sewage activator comprising, in combination, a rotative shaft journaled within a sewage activation tank, a supporting cage thereon, a plurality of compression chamber agitators having a hollow interior compartment provided with a longitudinal opening and being axially and rotatively mounted within said supporting cage, and balanced whereby the said openings are below the center of gravity, and tripping mechanism adapted to invert said compression chamber agitators beneath the surface of the sewage whereby entrapped air contained therein is released.

2. The substance of claim 1 and a baffle diffusion plate suspended above the tripping area of said compression chamber agitators.

3. In the device described in claim 1 wherein said tripping mechanism comprises a tripping cam attached to the bottom of the tank.

4. A sewage activator comprising, in combination, a rotative shaft journaled within a sewage activation tank, a supporting cage thereon, a plurality of compression chamber agitators having a hollow interior compartment provided with a longitudinal opening and being axially and rotatively mounted within said supporting cage and balanced whereby the said openings are below the center of gravity, bell cranks extending from the shaft ends of the axial supports of said compression chambers having thimbles operative in a guide channel adapted to hold said compression chambers in a predetermined position while descending into the sewage liquid, and with tripping mechanism whereby the compression chamber agitators are inverted during the lower arc of their rotation.

5. Sewage activation apparatus comprising, in combination, an activation tank having a rounded semi cylindrical bottom, a rotative supporting cage journaled therein having its periphery substantially conformable to the curvature of said tank bottom, said cage having a plurality of compression chamber agitators with hollow interior compartments provided with longitudinal openings and being axially and rotatively mounted within said cage and balanced whereby the said openings are below the center of gravity, and tripping mechanism adapted to invert said compression chamber agitators beneath the surface of the sewage whereby entrapped air contained therein is released, and means for rotating said supporting cage.

6. Sewage activation apparatus comprising, in combination, an activation tank having a plurality of rounded semi-cylindrical bottoms connected by raised baffle separators, sewage activators, comprising rotative shafts with supporting cages thereon, a plurality of compression chamber agitators having hollow interior compartments provided with longitudinal openings and being axially and rotatively mounted within said supporting cages and balanced so that said openings are below the center of gravity, and tripping mechanism adapted to invert said compression chamber agitators beneath the surface of the sewage, whereby entrapped air contained therein is released, adapted to operate within said rounded bottoms, and mechanical means for rotating said activators.

DONALD C. SCOTT.